(No Model.) 2 Sheets—Sheet 1.

J. V. WOODHOUSE.
FUME ARRESTER.

No. 249,719. Patented Nov. 15, 1881.

Attest:
Saml. S. Boyd
John U. Sapp.

Inventor:
John V. Woodhouse
by C. D. Moody
atty

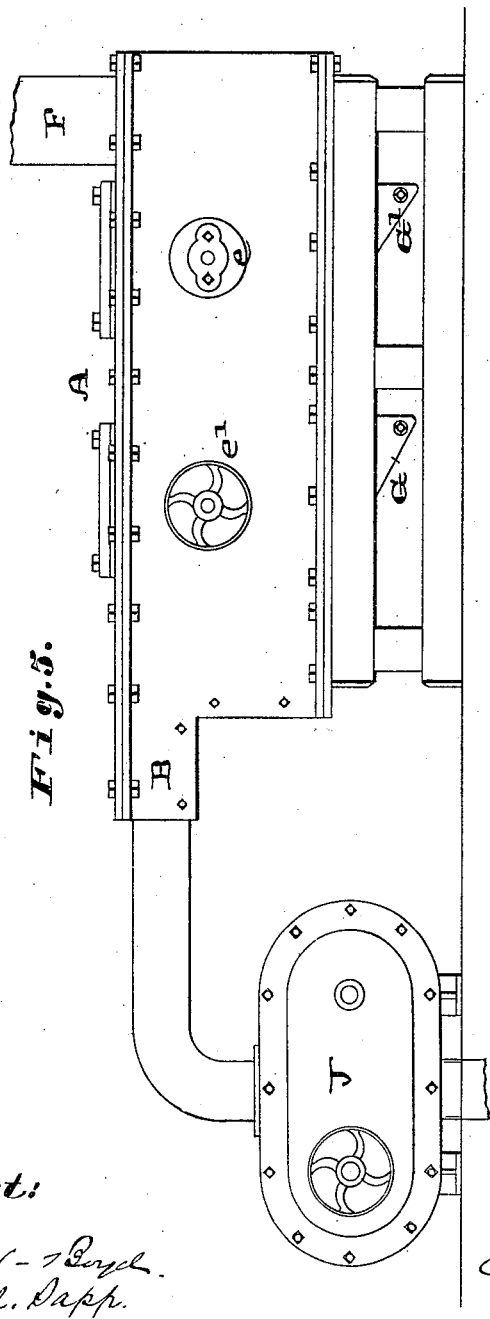

United States Patent Office.

JOHN V. WOODHOUSE, OF JOPLIN, MISSOURI, ASSIGNOR OF ONE-HALF TO OLIVER H. PICHER AND WM. H. PICHER, OF SAME PLACE.

FUME-ARRESTER.

SPECIFICATION forming part of Letters Patent No. 249,719, dated November 15, 1881.

Application filed April 14, 1881. (No model.)

*To all whom it may concern:*

Be it known that I, JOHN V. WOODHOUSE, of Joplin, Missouri, have made a new and useful Improvement in Fume-Arresters, of which the following is a full, clear, and exact description, reference being had to the annexed drawings, making part of this specification, in which—

Figure 1:
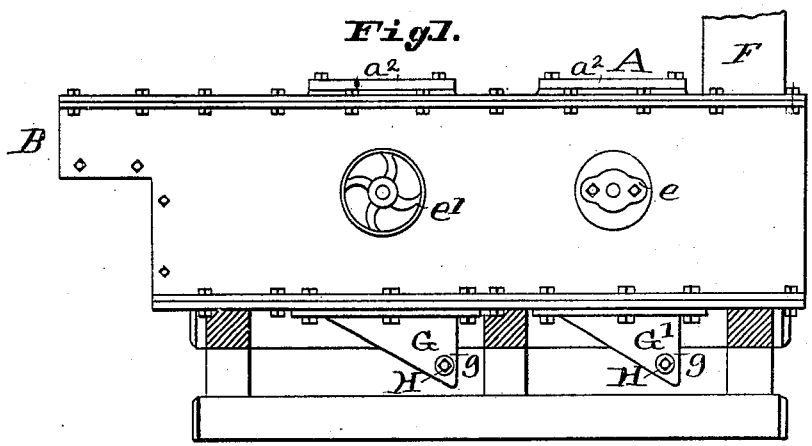
Figure 2:
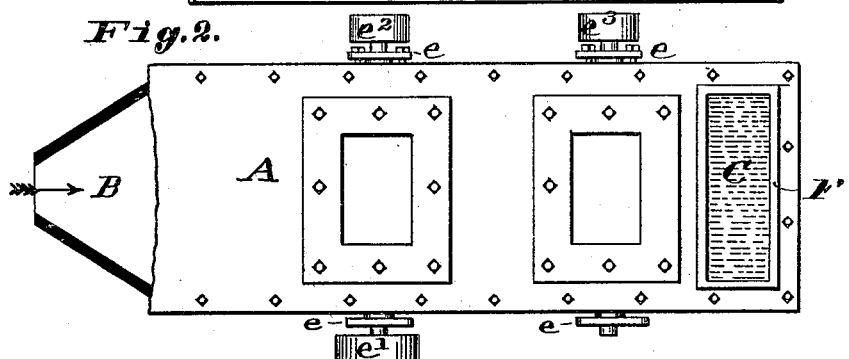
Figure 3:
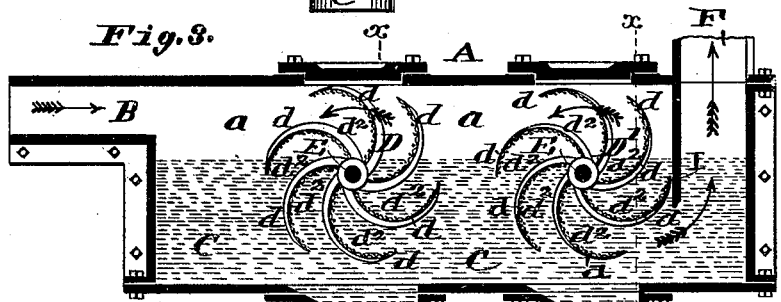
Figure 4:
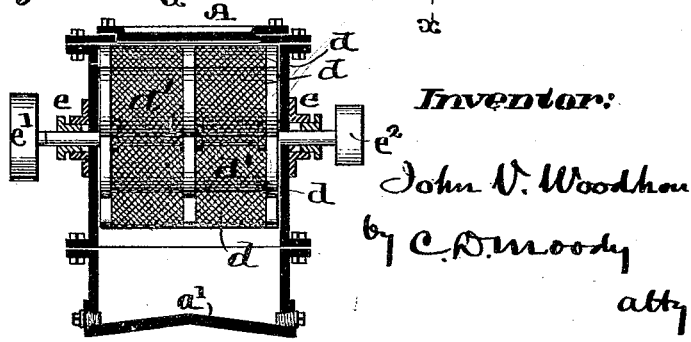

Figure 1 is a side elevation of the improvement; Fig. 2, a plan, a portion of the roof being broken away; Fig. 3, a central vertical longitudinal section; Fig. 4, a transverse vertical section taken on the line $x\ x$ of Fig. 3, and Fig. 5 a view showing the improvement in connection with a blower.

The same letters denote the same parts.

The present invention is an improvement in that class of fume-arresters wherein the fume-laden gas or smoke is deprived of the fumes by being passed through a body of water.

In its general construction the improvement consists of a blower and a chamber closed, saving at the inlet and outlet thereto, and containing a body of water, the surface of which is below the inlet and above the outlet of the chamber, and one or more moving devices—such as rotating fans—for agitating and more effectually bringing together and mixing the gas and water, and for breaking up the body of gas within the water. The gaseous currents carrying the fumes in question, and being such as come from zinc, lead, and other fume-producing furnaces, are delivered to the chamber above the water-level therein, and thence and by the action of the blower caused to descend into and with the aid of the fans be broken up in the water, depositing the fumes in the water and at the bottom of the chamber, and then escaping from the water and chamber, the outlet from the chamber being suitably trapped to prevent the passage of the gas above the water directly to the outlet.

A desirable apparatus for carrying out the improvement is shown in the annexed drawings, where A represents the fume-arresting chamber. The gaseous currents enter the chamber through the inlet B, passing into the space $a$ above the water C. From the space $a$ the gases are forced downward into the water C, the operation being effected by the blower J.

D D' represent fans, which are attached to the shafts E, turning in bearings $e$, and caused to rotate by suitable means—such as belting applied to the pulleys $e'\ e^2\ e^3$. The vanes $d\ d$ of the fans are curved substantially as shown, and are preferably made of wire-gauze $d'$, or otherwise perforated. One or more fans can be used, arranged one after the other, between the inlet B and outlet F. The fans are also arranged and proportioned to submerge the lower half and center of the fan, and to extend above the water-level, as nearly to the roof and sides of the space $a$ as is practicable, the best results being obtained when the vanes are extended the closest to the sides and roof. The fans partially retard the passage of the gas above the water, and also serve to influence the descent of the gas and to deflect it into the water; but their main function is to thoroughly break up the body of gas in the water, to agitate the water, and to mix the gas and water. The gas is very effectually brought in contact with the water in the manner described, even when the vanes $d$ are imperforate; but the efficiency of the apparatus is increased when the vanes are perforated, as when composed of fine wire-gauze, the latter operating as the fans rotate to divide both the water and the gas and to bring them more intimately in contact. The vanes $d$ also, after being carried through the water and having been thereby moistened, operate in turn to moisten the gas, even in the space $a$, and the gauze in this respect also is more efficient than an imperforate vane.

Two or more fans, D D' D², arranged successively in the chamber, improve the working of the device. These are so mounted that their blades or leaves $d$ come as near as possible to the top of the chamber, and thus the fans or agitators will operate in the water as well as in the air-space over it, and not only agitate the water, but more thoroughly spray the portions of water which are dashed into the upper part of the chamber, and so more perfectly act on the fumes. After the elimination of the fumes the gas escapes at the outlet F. The fume-sediment is collected conveniently in the pockets G G', one being arranged beneath each fan. The side $g$ of the pocket next to the outlet F is made vertical, to operate as a shoulder to arrest the forward movement of the sediment. By withdrawing the plugs H the sediment can be taken from the chamber A. The bottom $a'$ of the latter is preferably inclined—say each way from the center of the chamber—to facilitate the discharge of the sediment.

The chamber A may be widened or elevated, as desired, or otherwise varied in its general outline or shape to suit the circumstances and conditions of the locality at which the improvement may be in use. The chamber may be furnished with man-holes $a^2$ above each fan.

The partition I prevents the escape of the gas from the space $a$ directly into the outlet F. A blower, J, is suitably connected with the fume-arresting chamber.

I claim—

1. In a fume-arrester, substantially as described, the chamber A, having its inlet-port at the top and higher than the escape-passage at the end of the vertical partition I on the opposite side of said chamber, and provided with the fans D, adapted to operate between said inlet and exit ports, and partly in and partly out of the water, substantially as described.

2. In combination with the blower J, the chamber A, provided with pockets G G', one or more, and having the inlet B at the top of one end, and the partition I at the opposite end, extending about two-thirds the distance from top to the bottom and in front of the exit-port, and one or more fans, D D', intermediate between the inlet and exit ports, all substantially as shown and described.

J. V. WOODHOUSE.

Witnesses:
OLIVER H. PICHER,
GEORGE W. GORE.